United States Patent
Ueda

(10) Patent No.: US 7,499,245 B2
(45) Date of Patent: Mar. 3, 2009

(54) MAGNETIC HEAD SLIDER HAVING STEPPED SURFACES

(75) Inventor: Junsei Ueda, Niigata-ken (JP); Shouhei Ueda, legal representative, Fukushima-ken (JP); Mihoko Ueda, legal representative, Fukushima-ken (JP); Yasuyuki Kondo, legal representative, Niigata-ken (JP)

(73) Assignee: TDK Corporation, Tokyo (JP)

( * ) Notice: Subject to any disclaimer, the term of this patent is extended or adjusted under 35 U.S.C. 154(b) by 351 days.

(21) Appl. No.: 11/339,418

(22) Filed: Jan. 25, 2006

(65) Prior Publication Data

US 2006/0176616 A1    Aug. 10, 2006

(30) Foreign Application Priority Data

Feb. 2, 2005    (JP) .............................. 2005-025916

(51) Int. Cl.
*G11B 5/60* (2006.01)
(52) U.S. Cl. .................................................... 360/236.3
(58) Field of Classification Search ............... 360/236.6
See application file for complete search history.

(56) References Cited

U.S. PATENT DOCUMENTS 6,504,982 B1    1/2003    Sannino et al.

2004/0027724 A1 *    2/2004    Pendray et al. .......... 360/236.3

FOREIGN PATENT DOCUMENTS

| JP | 2003-515869 | 5/2003 |
| JP | 2004-071140 | 3/2004 |
| WO | WO 01/41141 | 6/2001 |
| WO | WO 01/41141 A2 | 6/2001 |
| WO | WO 01/41141 A3 | 6/2001 |
| WO | 2003-515869 | 5/2003 |

OTHER PUBLICATIONS

Notification of Reasons for Refusal for corresponding Japanese Patent Application Serial No. 2005-025916, dated Aug. 14, 2007.

* cited by examiner

*Primary Examiner*—Tianjie Chen
(74) *Attorney, Agent, or Firm*—Brinks Hofer Gilson & Lione

(57) ABSTRACT

On a disk-facing surface of a magnetic head slider, rail surfaces that are at the same height as a magnetic device surface and raised leading surfaces connect the magnetic device surface to the raised leading surfaces. Moreover, a central step surface at a level lower than the magnetic device surface and higher than a recessed area extends from an area between the raised leading surfaces to an area between the rail surfaces. Therefore, even if the amount of Air intake is reduced due to atmospheric pressure changes or the like, air can be efficiently guided to the magnetic device surface and thus, the flying position of the magnetic head slider can be stabilized.

1 Claim, 11 Drawing Sheets

MAGNETIC HEAD SLIDER HAVING STEPPED SURFACES

BACKGROUND OF THE INVENTION

1. Field of the Invention

The present invention relates to magnetic head sliders with a magnetic device for writing a signal to and/or reading a signal from a magnetic disk, and particularly to a magnetic head slider that reduces variations in flying height caused in particular by atmospheric pressure changes.

2. Description of the Related Art

PCT Japanese Translation Patent Publication No. 2003-515869 discloses various forms of disk-facing surfaces of magnetic head sliders.

A disk-facing surface of a magnetic head slider generally has a recessed area that is located at the lowest level and causes a negative pressure, and a raised surface that causes a positive pressure. Conventionally, the shapes of the recessed area and raised surface, the area ratio therebetween with respect to the magnetic disk, and the like are adjusted to achieve a stable flying position of the magnetic head slider.

The flying position of the magnetic head slider tends to become unstable due to a reduction in the amount of air inflow caused by, for example, changes in atmospheric pressure and a reduction in peripheral speed associated with the reduced size of the magnetic disk. However, PCT Japanese Translation Patent Publication No. 2003-515869 described above proposes no specific approach to stabilize the unstable flying position of the magnetic head slider caused by a reduction in the amount of air inflow.

In general, a raised surface that causes a positive pressure is provided on both the leading and trailing sides of a magnetic head slider. A raised surface on the trailing side is a magnetic device surface where a surface of a magnetic device is exposed, while a raised surface on the leading side is divided into the right and left sides, such as side rails 210 and 212 shown in FIG. 2 of PCT Japanese Translation Patent Publication No. 2003-515869. In FIG. 2 of this document, a cavity dam 230 is provided at a level lower than the side rails 210 and 212.

FIG. 2 of PCT Japanese Translation Patent Publication No. 2003-515869 shows a typical disk-facing surface on which a cavity (which is a negative pressure generating surface) 236 of a certain height is surrounded by rails, and a separate center pad 240 including a magnetic device is provided.

In this disk-facing surface, air from the leading side flows, before reaching the separate center pad 240, over an uneven surface, which is made up of the cavity dam 230, cavity 236, and the like with varying heights different from the height of the center pad 240. This uneven surface causes the air to be disturbed, causes the air to escape from the sides of the center pad 240, and so on. In addition, a reduction in the amount of air inflow due to atmospheric pressure changes or the like considerably reduces the amount of air that reaches the center pad 240, which causes a positive pressure, and thus reduces the flying height of the magnetic head slider.

Another disk-facing surface of a magnetic head slider disclosed in PCT Japanese Translation Patent Publication No. 2003-515869 is one in which, as shown in FIG. 8, a rail surface at the same height as a cavity dam 506 extends from the cavity dam 506 to a center rail 508. Specifically, in FIG. 8 of this document, a convex center-rail bearing surface 516 located at the highest level is provided as a positive pressure generating surface. Side rails 502 and 504 are also provided as positive pressure generating surfaces on the leasing side.

However, an experiment (described below in Comparative Example 1 in FIG. 7 of the present invention) revealed that, even with this structure shown in FIG. 8 of PCT Japanese Translation Patent Publication No. 2003-515869, the loss of air until it reached the center-rail bearing surface 516 was significant, and that the flying height of the magnetic head slider was greatly reduced by a reduction in the amount of air inflow due to atmospheric pressure changes or the like.

SUMMARY OF THE INVENTION

In an aspect of the present invention, a magnetic head slider includes a slider and a magnetic device disposed on a trailing edge of the slider and configured to write a signal to and/or read a signal from a magnetic disk. A disk-facing surface of the slider has a recessed area located at the lowest level; a magnetic device surface disposed on a trailing side, rising toward the magnetic disk, and where a surface of the magnetic device is exposed; raised leading surfaces disposed on a leading side opposite the trailing side, raised to the height of the magnetic device surface, and separated in a width direction orthogonal to a length direction extending from the trailing side to the leading side; rail surfaces raised to the height of the magnetic device surface and connecting the magnetic device surface to the raised leading surfaces; and a step surface extending from an area between the raised leading surfaces to an area between the rail surfaces and located at a level lower than the magnetic device surface and higher than the recessed area.

In the present invention, the magnetic device surface, the raised leading surfaces, and the rail surfaces are all at the same height. The rail surfaces connect the magnetic device surface to the raised leading surfaces. The raised leading surfaces are separated in the width direction and an air intake is provided between the raised leading surfaces. The step surface at a level lower than the magnetic device surface and higher than the recessed area extends from the area between the raised leading surfaces to the area between the rail surfaces. With the structure of the present invention, air flowing from the leading side toward the trailing side can be efficiently and smoothly guided to the magnetic device surface even if the amount of air is reduced due to atmospheric pressure changes or the like, and the flying position of the magnetic head slider can be stabilized.

In the present invention, it is preferable that the recessed area be located on the trailing side of the raised leading surfaces, and provided in the side regions that face each other, in the width direction, across the rail surfaces between which the step surface is interposed. With the recessed area, which is a surface that causes a negative pressure, negative and positive pressures can be kept in balance, and the flying position of the magnetic head slider can be stabilized.

In the present invention, the magnetic device surface, the raised leading surfaces, and the rail surfaces are all at the same height. The rail surfaces connect the magnetic device surface to the raised leading surfaces. The raised leading surfaces are separated in the width direction and an air intake is provided between the raised leading surfaces. The step surface at a level lower than the magnetic device surface and higher than the recessed area extends from the area between the raised leading surfaces to the area between the rail surfaces. With the structure of the present invention, air flowing from the leading side toward the trailing side can be efficiently and smoothly guided to the magnetic device surface even if the amount of air is reduced due to atmospheric pressure changes or the like, and the flying position of the magnetic head slider can be stabilized.

DESCRIPTION OF THE PREFERRED EMBODIMENTS

Figure 1:
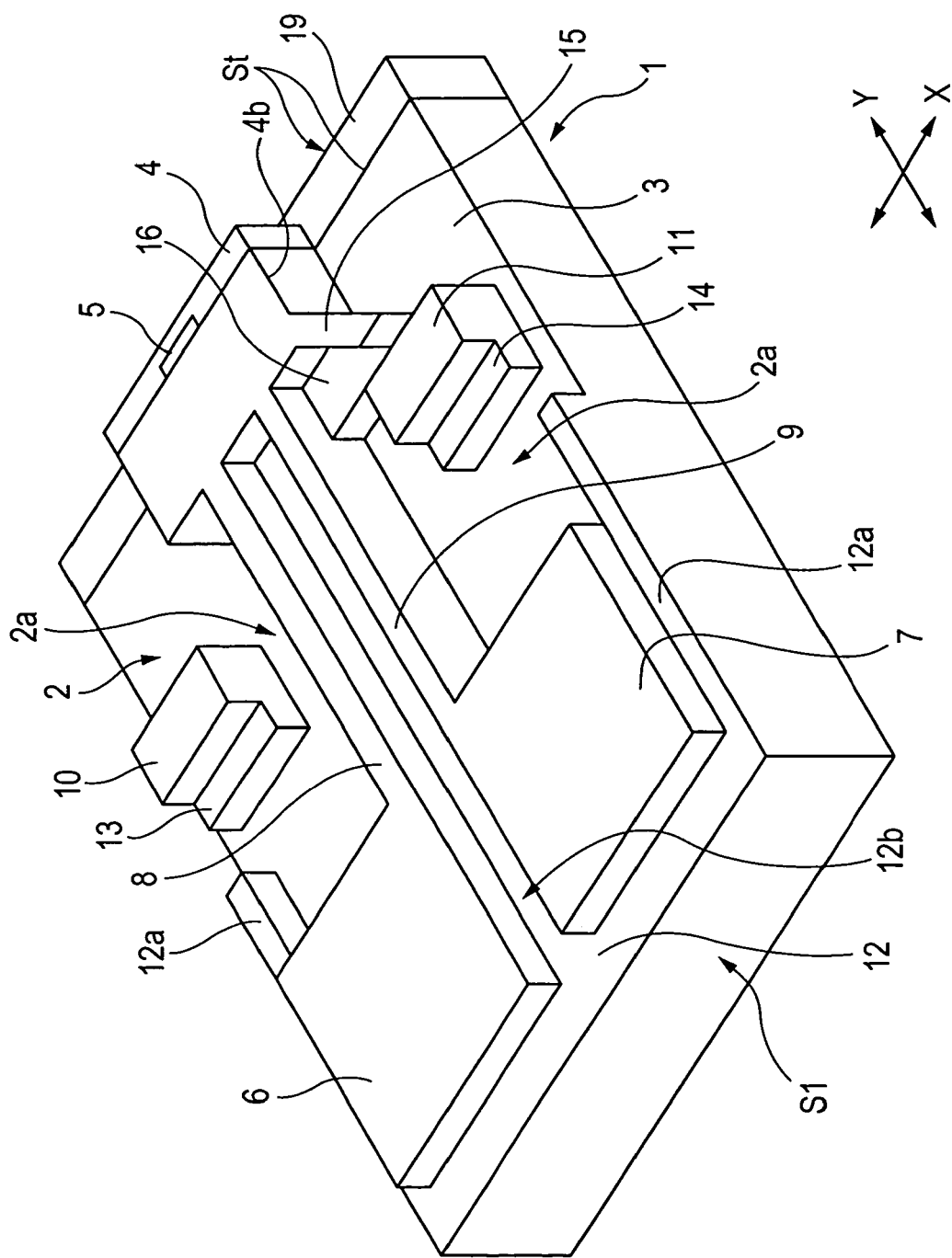
FIG. 1 is a perspective view of a magnetic head slider (Embodiment 1) with a disk-facing surface face up, according to an embodiment of the present invention.
Figure 2:
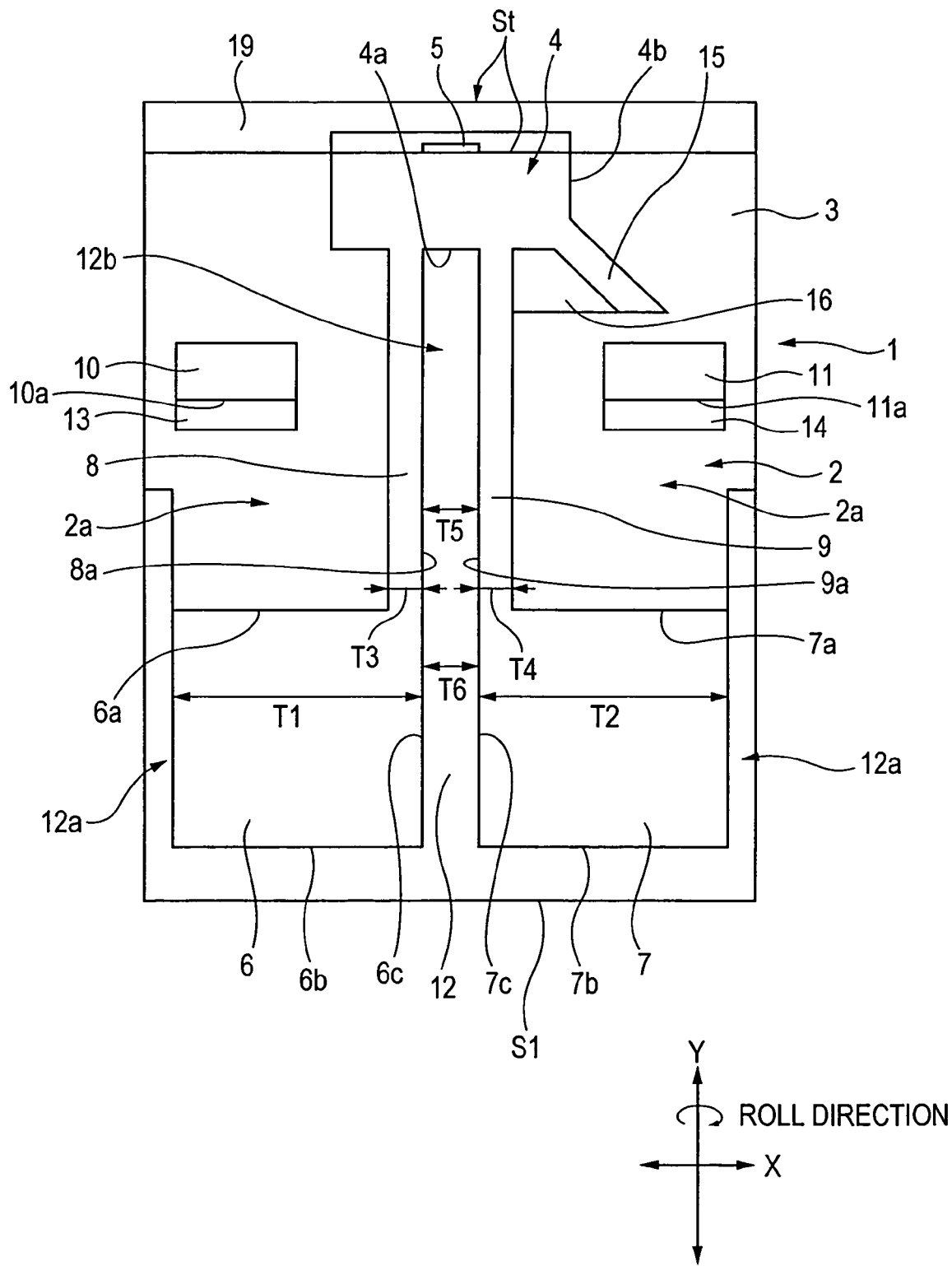
FIG. 2 is a plan view of the magnetic head slider in FIG. 1, as viewed from the disk-facing surface.
Figure 3:
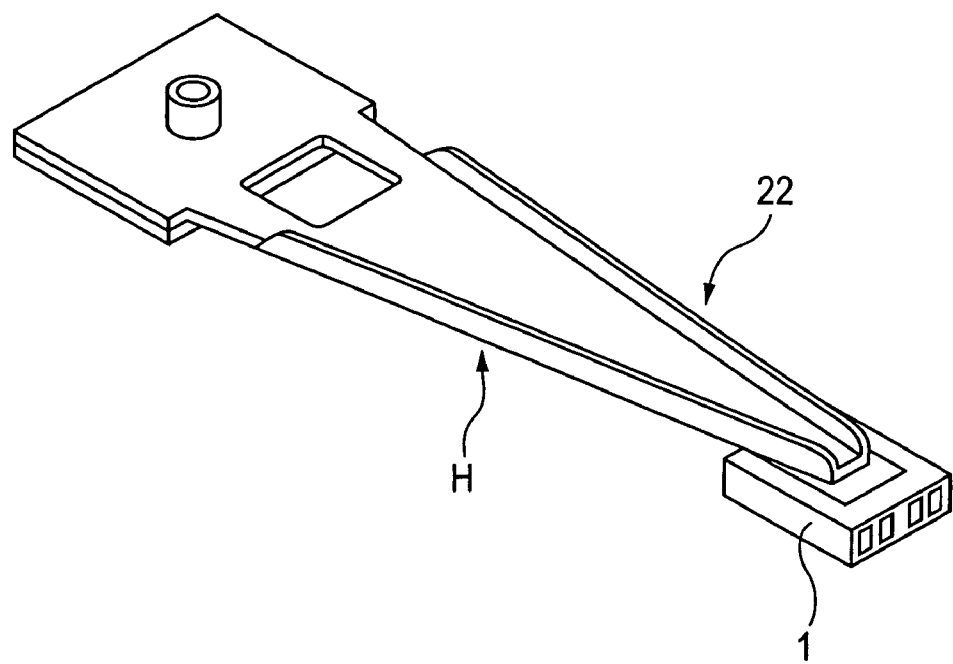
FIG. 3 is a partial perspective view of a magnetic head assembly, with the magnetic head slider attached to a supporting member.
Figure 4:
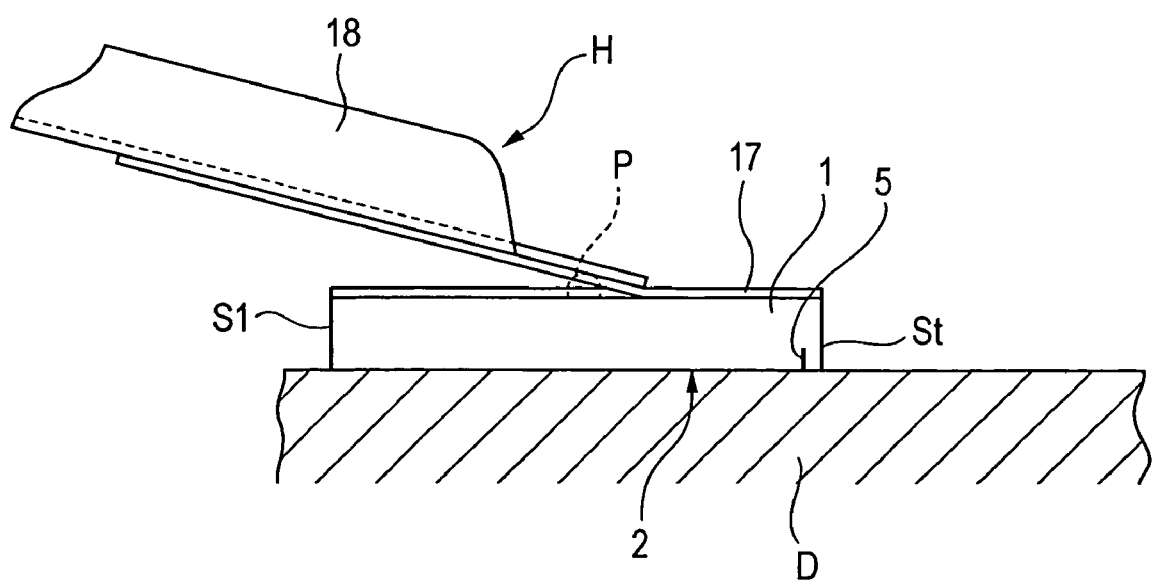
FIG. 4 is a partial side view of the magnetic head assembly, with the magnetic head slider of the present invention being at rest on a magnetic disk.
Figure 5:
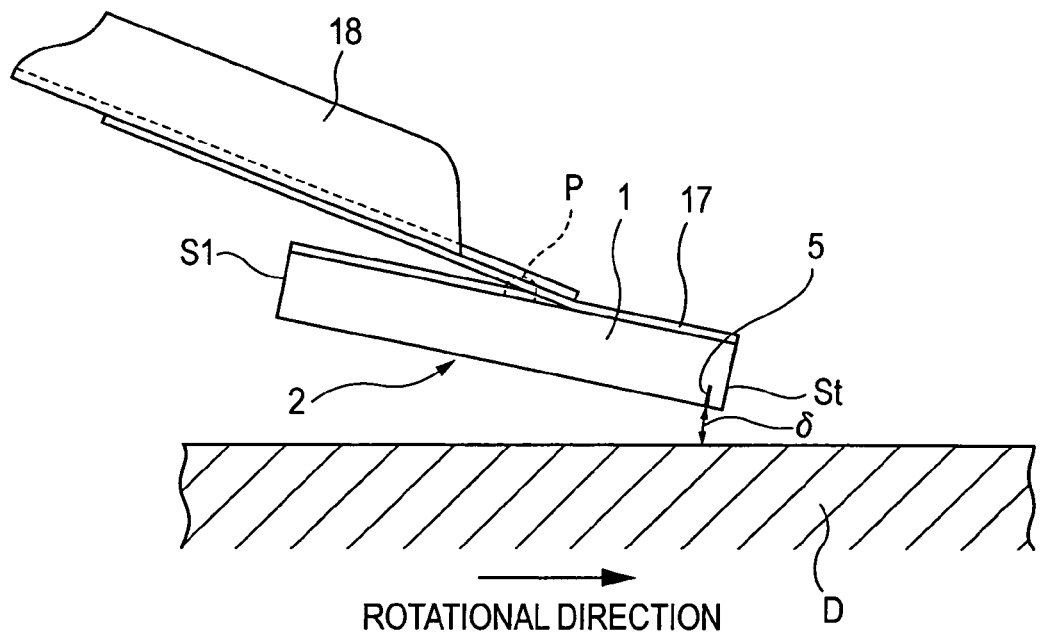
FIG. 5 is a partial side view of the magnetic head assembly, with the magnetic head slider of the present invention being flying above the magnetic disk.

FIG. 1 is a perspective view of a magnetic head slider with a disk-facing surface face up, according to an embodiment of the present invention. FIG. 2 is a plan view of the magnetic head slider shown in FIG. 1, as viewed from the disk-facing surface. FIG. 3 is a partial perspective view of a magnetic head assembly, with the magnetic head slider attached to a supporting member. FIG. 4 is a partial side view of the magnetic head assembly, with a magnetic head slider of the present invention being at rest on a magnetic disk. FIG. 5 is a partial side view of the magnetic head assembly, with the magnetic head slider of the present invention being flying above the magnetic disk.

A magnetic head slider 1 shown in FIG. 1 and FIG. 2 constitutes a part of the magnetic head assembly H. For example, as in FIG. 3, the magnetic head slider 1 is attached to a supporting member 22 that elastically supports the magnetic head slider 1 from the surface opposite a disk-facing surface 2. The supporting member 22 includes a load beam 18, which is a leaf spring, and a flexure (elastic supporting member) 17, which is a thin leaf spring at the tip of the load beam 18.

The magnetic head assembly H is included in the magnetic disk apparatus and is capable of writing a magnetic signal to and/or reading a magnetic signal from the magnetic disk D.

FIG. 4 shows a state in which the magnetic head slider 1 constituting a part of the magnetic head assembly H is at rest on the magnetic disk D inside the magnetic disk apparatus. The rotation of the magnetic disk D from the resting state shown in FIG. 4 causes the magnetic head slider 1 to fly above the magnetic disk D and allows the above-described read and/or write operations to be performed (FIG. 5).

As shown in FIG. 4, the surface opposite the disk-facing surface 2 of the magnetic head slider 1 is bonded to the undersurface of the flexure 17. As shown, the flexure 17 is provided with a spherical pivot P projecting upward. The tip of the pivot P is in contact with the load beam 18.

In the state shown in FIG. 4, the magnetic head slider 1 is urged, with a small elastic force, by the supporting member 22 against the recording surface of the magnetic disk D. As shown in FIG. 5, the rotation of the magnetic disk D produces airflow, which allows a leading edge S1 of the magnetic head slider 1 to swing upward about the pivot P. After flying above the magnetic disk D, the magnetic head slider 1 moves over the asperities on the magnetic disk D about the pivot P in the pitch direction. As shown in FIG. 5, the magnetic head slider 1 is raised to a flying height a above the magnetic disk D. Hereinafter, the term "flying height" refers to the linear distance (shortest distance) from the surface of a magnetic device 5 to the surface of the magnetic disk D.

As shown in FIG. 1 and FIG. 2, the air intake end of the magnetic head slider 1 is called "leading edge S1", while the air outlet end of the magnetic head slider 1 is called "trailing edge St". Hereinafter, a direction toward the leading edge S1 and a position nearer to the leading edge S1 will be referred to as "leading side S1", while a direction toward the trailing edge St and a position nearer to the trailing edge St will be referred to as "trailing side St". Furthermore, a direction from the leading edge S1 to the trailing edge St will be referred to as the length direction (Y-direction in FIG. 1 and FIG. 2), while a direction orthogonal to the length direction will be referred to as the width direction (X-direction in FIG. 1 and FIG. 2).

The magnetic head slider 1 shown in FIG. 1 and FIG. 2 is made of, for example, alumina titanium carbide.

As shown in FIG. 1 and FIG. 2, the disk-facing surface 2 of the magnetic head slider 1 has a magnetic device surface 4 rising from a recessed area 3, which is located at the lowest level and on the trailing side St, toward the magnetic disk D. A magnetic device 5 on the trailing edge St of the magnetic head slider 1 is, for example, a combination of a magnetoresistive (MR) element, including a spin valve thin film element using a magnetoresistive effect, for read operations, with an inductive element for write operations; or either one of the MR element and the inductive element. As shown in FIG. 1 and FIG. 2, the magnetic device 5 is coated with a protective film 19 of, for example, $Al_2O_3$. The protective film 19 constitutes a part of the magnetic device surface 4.

A surface of the magnetic device 5 is exposed on the magnetic device surface 4. As described above, the magnetic device 5 performs write and read operations on the magnetic disk D.

As shown in FIG. 1 and FIG. 2, on the leading side S1 of the magnetic head slider 1, raised leading surfaces 6 and 7 that are at the same height as the magnetic device surface 4 are separately arranged in the width direction (X-direction in the drawings).

As further shown in FIG. 1 and FIG. 2, raised rail surfaces 8 and 9 that are at the same height as the magnetic device surface 4 and raised leading surfaces 6 and 7 are arranged in the area between a leading edge 4a of the magnetic device surface 4 and trailing edges 6a and 7a of the respective raised leading surfaces 6 and 7. The raised leading surfaces 6 and 7 are connected, via the rail surfaces 8 and 9, respectively, to the magnetic device surface 4.

As further shown in FIG. 1 and FIG. 2, side raised surfaces 10 and 11 that are at the same height as the magnetic device surface 4 are arranged on both sides of the rail surfaces 8 and 9 in the width direction (X-direction in the drawings). When the magnetic head slider 1 above the magnetic disk D tilts in a roll direction (in which the magnetic head slider 1 rotates about the Y-axis in the drawings), the side raised surfaces 10 and 11, which are positive pressure generating surfaces, limit the angle at which the magnetic head slider 1 tilts with respect to the surface of the magnetic disk D, and prevent both edges in the width direction (X-direction in the drawings) of the magnetic head slider 1 from coming into contact with the magnetic disk D. The magnetic device surface 4, the raised leading surfaces 6 and 7, the rail surfaces 8 and 9, and the side raised surfaces 10 and 11 are all at the same height and are positive pressure generating surfaces. On the other hand, the recessed area 3 at the lowest level in the disk-facing surface 2 is a surface that causes a negative pressure.

As shown in FIG. 1 and FIG. 2, a step surface 12 located at a level lower than the magnetic device surface 4, raised leading surfaces 6 and 7, and rail surfaces 8 and 9 and higher than the recessed area 3 is provided on the disk-facing surface 2. The step surface 12 that extends from the area between the raised leading surfaces 6 and 7 to the area between the rail surfaces 8 and 9 will be specifically referred to as a central step surface 12b. As shown, the step surface 12 is provided adjacent to leading edges 6b and 7b of the raised leading surfaces 6 and 7. The step surface 12 includes side step surfaces 12a arranged in the width direction (X-direction in the drawings) on both sides of the raised leading surfaces 6 and 7. The side step surfaces 12a extend beyond the trailing edges 6a and 7a toward the trailing side St. Thus, the step surface 12 surrounds the entire raised leading surfaces 6 and 7 except the trailing edges 6a and 7a.

The step surface 12 is not provided for generating a positive pressure or a negative pressure, but is provided for allowing air to easily flow from the air intake end on the leading side S1 to the air outlet end on the trailing side St. Step surfaces 13 and 14 adjacent to leading edges 10a and 11a of the side raised surfaces 10 and 11 are also provided for such a purpose. Of these step surfaces, the step surface 12 is particularly effective in facilitating quick transition from the resting state shown in FIG. 4 to the flying state shown in FIG. 5. Moreover, since the step surface 12 is provided adjacent to the leading edges 6b and 7b of the raised leading surfaces 6 and 7 that are positive pressure generating surfaces located at a level higher than the step surface 12, air is properly supplied from the step surface 12 to the raised leading surfaces 6 and 7, where a positive pressure can be generated properly.

As shown in FIG. 1 and FIG. 2, a flying height adjusting surface 15 extends from a side edge 4b of the magnetic device surface 4 toward the leading side S1, while tilting in the width direction (X-direction in the drawings). The flying height adjusting surface 15 is at the same height as the magnetic device surface 4 and is provided for adjusting changes in flying height caused by variations in the angle and speed of air inflow. As shown, a step surface 16 is provided between the flying height adjusting surface 15 and the rail surface 9.

A feature of the present invention is that the trailing edges 6a and 7a of the raised leading surfaces 6 and 7 are connected to the leading edge 4a of the magnetic device surface 4 via the rail surfaces 8 and 9 that are at the same height as the magnetic device surface 4 and raised leading surfaces 6 and 7, while the central step surface 12b that is at a level lower than the magnetic device surface 4 and higher than the recessed area 3 is provided between the raised leading surfaces 6 and 7 and between the rail surfaces 8 and 9.

Since the rail surfaces 8 and 9 that are at the same height as the magnetic device surface 4 and raised leading surfaces 6 and 7 connect the magnetic device surface 4 to the raised leading surfaces 6 and 7, air compressed by the raised leading surfaces 6 and 7 on the air intake end side can be smoothly guided to the magnetic device surface 4 through the rail surfaces 8 and 9 as there is no obstacle, such as a difference in surface level. Thus, air can be efficiently guided to the magnetic device surface 4 even if the amount of air intake is reduced due to atmospheric pressure changes or the like.

Air from the central step surface 12b smoothly flows to the magnetic device surface 4 through a path defined by the raised leading surfaces 6 and 7 and rail surfaces 8 and 9, which are arranged, in the width direction (X-direction in the drawings), on both sides of the central step surface 12b and are at a level higher than the central step surface 12b. For example, an experiment described below revealed that if the recessed area 3 instead of central step surface 12b was provided between the raised leading surfaces 6 and 7 and/or between the rail surfaces 8 and 9, variations in the amount of air intake due to atmospheric pressure changes tended to cause variations in flying height compared to the case of the structure shown in FIG. 1 and FIG. 2. Since providing the recessed area 3 between the raised leading surfaces 6 and 7 and/or between the rail surfaces 8 and 9 increases the negative pressure area, the flying height of the magnetic head slider 1 is significantly reduced even with a large amount of air inflow, and it becomes more likely that the magnetic head slider 1 comes into contact with the magnetic disk D having asperities on its surface. Moreover, if the area between the rail surfaces 8 and 9 is at the same height as the recessed area 3, air passing between the rail surfaces 8 and 9 tends to collide with the leading edge 4a of the magnetic device surface 4 and be disturbed, and thus cannot properly flow to the magnetic device surface 4. If both the recessed area 3 and the step surface 12 are provided between the raised leading surfaces 6 and 7 and between the rail surfaces 8 and 9, a difference in height between the area between the raised leading surfaces 6 and 7 and the area between the rail surfaces 8 and 9 tends to cause an air disturbance and variations in the flying height of the magnetic head slider 1 if the amount of air inflow is changed due to atmospheric pressure changes or the like. Therefore, the central step surface 12b extends from the area between the raised leading surfaces 6 and 7 to the area between the rail surfaces 8 and 9.

As shown in FIG. 2, inside edges 8a and 9a of the rail surfaces 8 and 9 face each other in the width direction (X-direction in the drawing), while inside edges 6c and 7c of the raised leading surfaces 6 and 7 face each other in the width direction (X-direction in the drawing). The inside edges 8a and 9a extend from the inside edges 6c and 7c, respectively. The rail surfaces 8 and 9 having a width T3 and a width T4, respectively, which are smaller than a width T1 and a width T2 of the raised leading surfaces 6 and 7, respectively, extend from the trailing edges 6a and 7a of the raised leading surfaces 6 and 7 to the leading edge 4a of the magnetic device surface 4. It is preferable, as described above, that the inside edges 8a and 9a of the rail surfaces 8 and 9 continue from the inside edges 6c and 7c of the raised leading surfaces 6 and 7. If the inside edges 8a and 9a are displaced from the inside edges 6c and 7c, respectively, in the width direction (X-direction in the drawing), a distance T5 between the rail surfaces 8 and 9 differs from a distance T6 between the raised leading surfaces 6 and 7, particularly at the boundary between the raised leading surfaces 6 and 7 and the rail surfaces 8 and 9. This causes disturbance in airflow, prevents smooth airflow to the magnetic device surface 4, and tends to cause the unstable flying position of the magnetic head slider 1 due to the reduced amount of airflow associated with atmospheric pressure changes. In particular, if the distance T5 between the rail surfaces 8 and 9 is smaller than the distance T6 between the raised leading surfaces 6 and 7, compressed air cannot be efficiently guided from the raised leading surfaces 6 and 7 to the rail surfaces 8 and 9, the amount of air that reaches the magnetic device surface 4 is reduced, and thus the flying position of the magnetic head slider 1 tends to become unstable.

While the rail surfaces 8 and 9 are parallel to each other in FIG. 1 and FIG. 2, the present invention is not limited to this particular structure.

The sum of the areas of the raised leading surfaces 6 and 7 is larger than the area of the magnetic device surface 4. As shown in FIG. 5, when the magnetic head slider 1 flies above, since the leading edge S1 is raised to a level higher than that of the trailing edge St, a positive pressure higher than that applied to the trailing side St needs to be applied to the leading side S1 of the magnetic head slider 1. Therefore, the sum of the areas of the raised leading surfaces 6 and 7, which are positive pressure generating surfaces, is larger than the area of the magnetic device surface 4.

As shown in FIG. 1 and FIG. 2, on the disk-facing surface 2 of the magnetic head slider 1, the area other than the magnetic device surface 4, the raised leading surfaces 6 and 7, the side raised surfaces 10 and 11, and the step surfaces 12, 13, and 14 is occupied by the recessed area 3, which is at the lowest level and generates a negative pressure when the magnetic head slider 1 flies above.

If the recessed area 3 is provided at least in side regions 2a and 2a that are arranged on the trailing side St of the raised leading surfaces 6 and 7 and face each other, in the width direction (X-direction in the drawings), across the rail surfaces 8 and 9 between which the central step surface 12b is interposed, the magnetic head slider 1, when flying above, can easily go into tilt position in which the trailing edge St rather than the leading edge S1 is closer to the magnetic disk D. At the same time, since negative pressure generating regions can be provided on both sides of the rail surfaces 8 and 9 and central step surface 12b, the area extending from the raised leading surfaces 6 and 7 to the magnetic device surface 4 can be clearly divided into positive pressure generating regions and negative pressure generating regions. Therefore, even if the amount of air inflow is reduced, positive and negative pressures can be kept in balance, and thus, the flying position of the magnetic head slider 1 can be stabilized.

Embodiment

The following six magnetic head sliders were prepared for the experiment mentioned above.

Embodiment 1

A magnetic head slider of Embodiment 1 is the magnetic head slider shown in FIG. 1 and FIG. 2.

COMPARATIVE EXAMPLE 1

Figure 7:
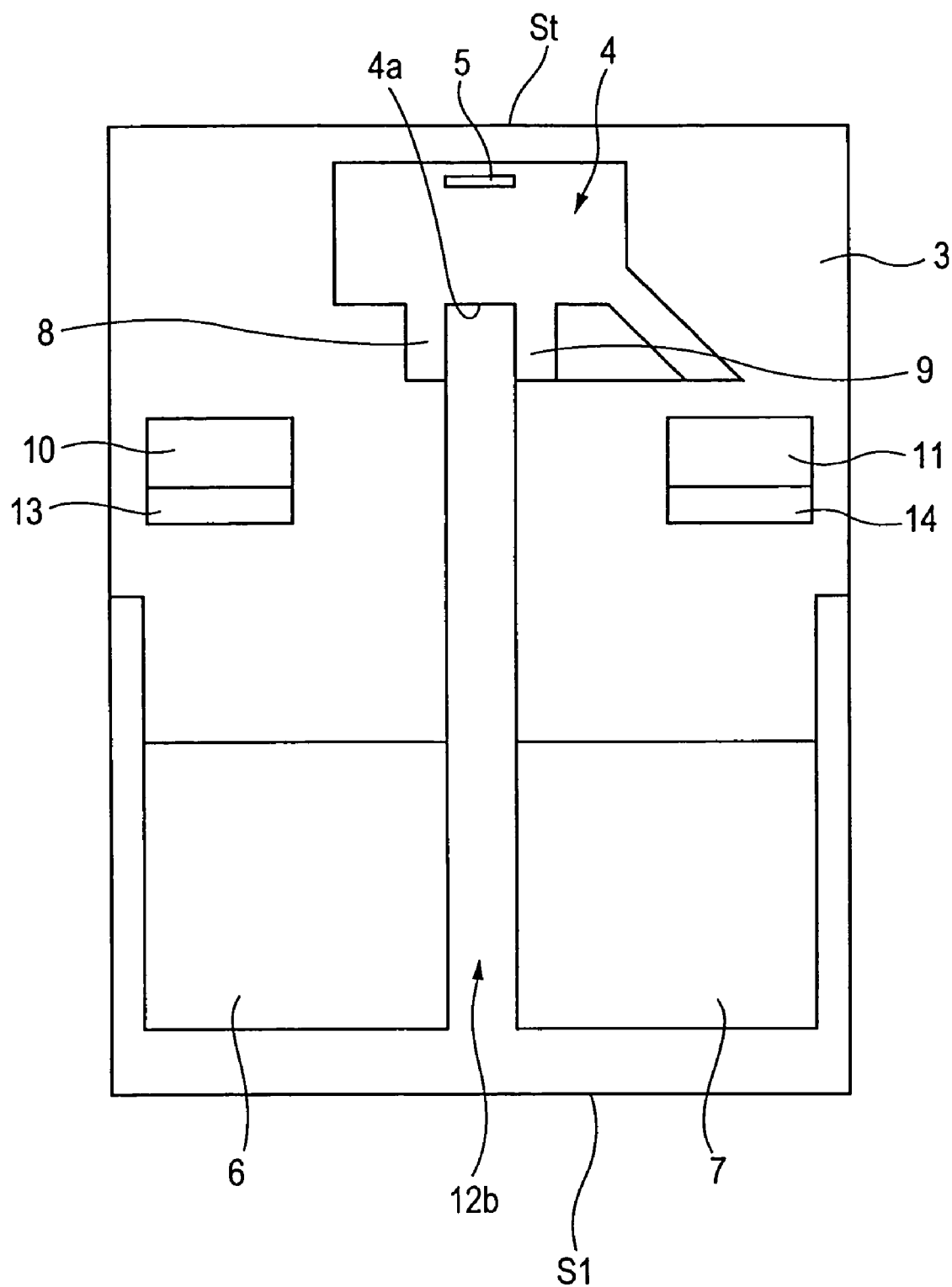
FIG. 7 is a plan view of a magnetic head slider of Comparative Example 1 as viewed from a disk-facing surface.

FIG. 7 is a plan view showing a magnetic head slider of Comparative Example 1. The magnetic head slider of Comparative Example 1 differs from that of Embodiment 1 shown in FIG. 2 in that rail surfaces 8 and 9 only slightly project from a leading edge 4a of a magnetic device surface 4 toward a leading side S1, and in that the magnetic device surface 4 is connected to the raised leading surfaces 6 and 7 not via the rail surfaces 8 and 9, but only via a central step surface 12b that is at a height lower than the rail surfaces 8 and 9.

COMPARATIVE EXAMPLE 2

Figure 8:
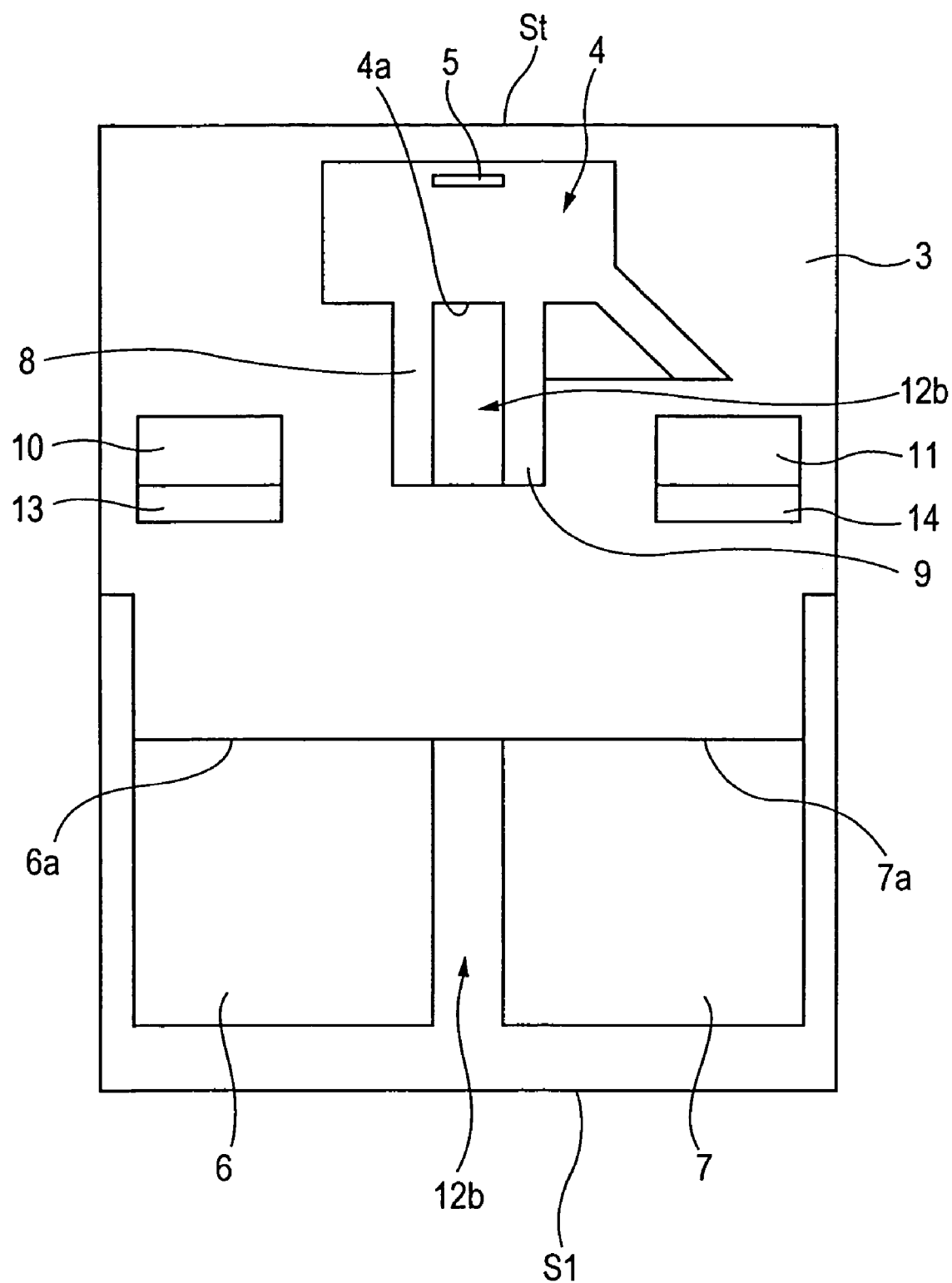
FIG. 8 is a plan view of a magnetic head slider of Comparative Example 2 as viewed from a disk-facing surface.

FIG. 8 is a plan view showing a magnetic head slider of Comparative Example 2. The magnetic head slider of Comparative Example 2 differs from that of Embodiment 1 shown in FIG. 2 in that rail surfaces 8 and 9 extending from a leading edge 4a of a magnetic device surface 4 toward a leading side S1 does not reach trailing edges 6a and 7a of raised leading surfaces 6 and 7, and in that while a central step surface 12b is provided between raised leading surfaces 6 and 7 and between rail surfaces 8 and 9, the central step surface 12b is not designed to connect the raised leading surfaces 6 and 7 to the rail surfaces 8 and 9, respectively, and is cut in the middle.

COMPARATIVE EXAMPLE 3

Figure 9:
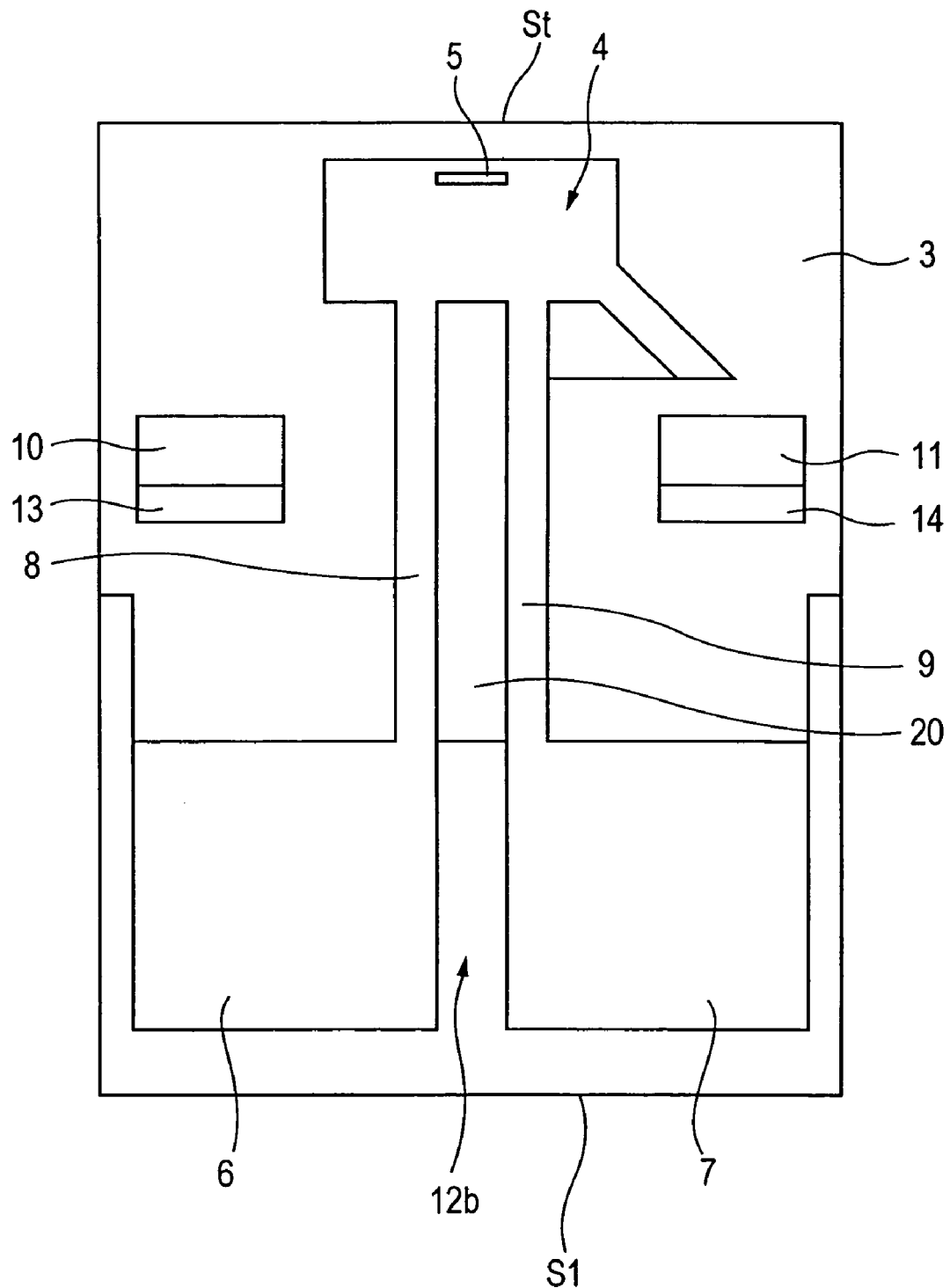
FIG. 9 is a plan view of a magnetic head slider of Comparative Example 3 as viewed from a disk-facing surface.

FIG. 9 is a plan view showing a magnetic head slider of Comparative Example 3. The magnetic head slider of Comparative Example 3 differs from that of Embodiment 1 shown in FIG. 2 in that a recessed area 20 that causes a negative pressure is provided between rail surfaces 8 and 9.

COMPARATIVE EXAMPLE 4

Figure 10:
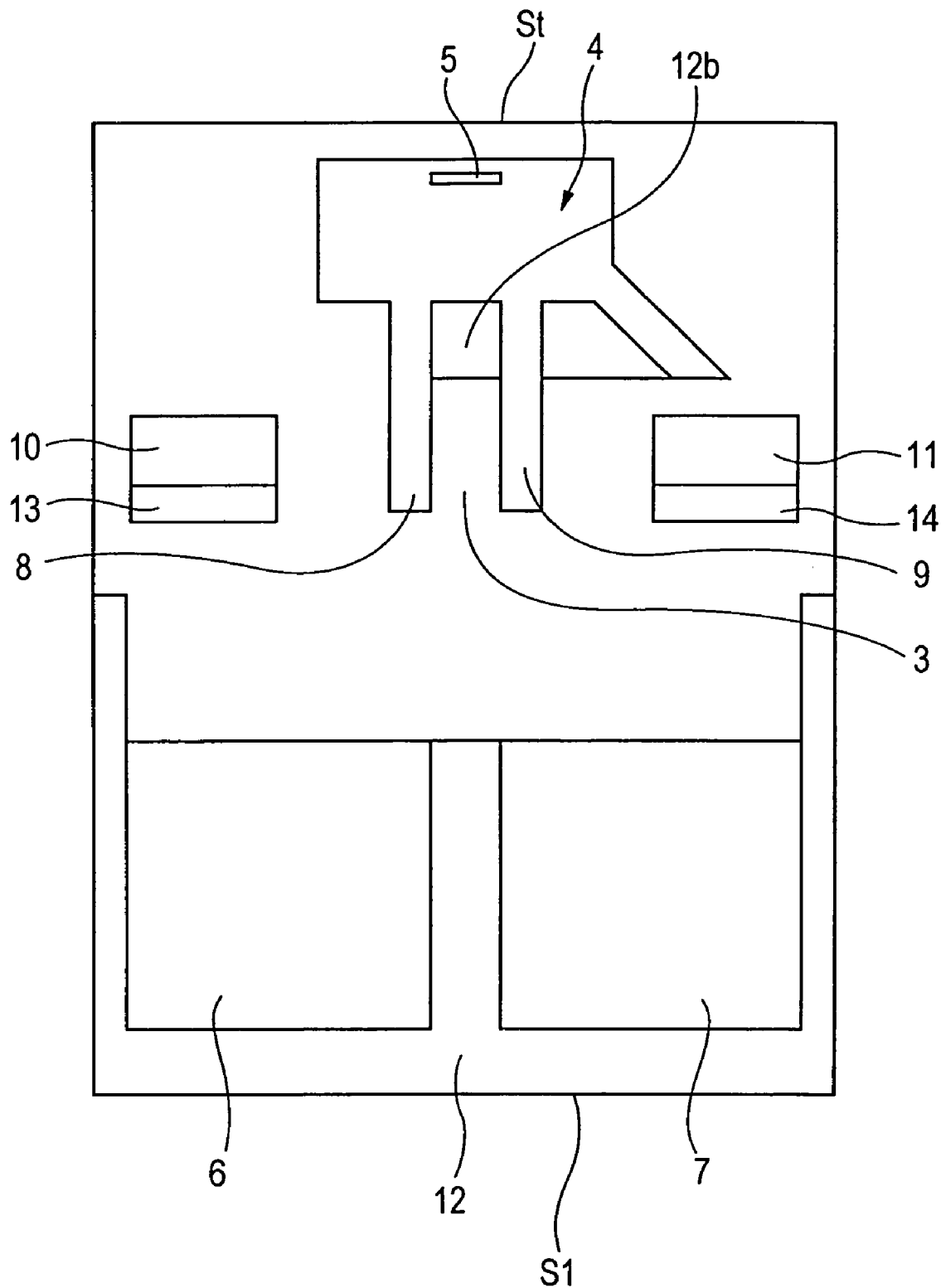
FIG. 10 is a plan view of a magnetic head slider of Comparative Example 4 as viewed from a disk-facing surface.

FIG. 10 is a plan view showing a magnetic head slider of Comparative Example 4. The magnetic head slider of Comparative Example 4 differs from that of Comparative Example 2 shown in FIG. 8 in that the length of a central step surface 12b between rail surfaces 8 and 9, in the length direction (Y-direction in the drawing), is shorter than that of the magnetic head slider in FIG. 8, and in that a recessed area 3 is provided on a leading side S1 of the area between the rail surfaces 8 and 9.

COMPARATIVE EXAMPLE 5

Figure 11:
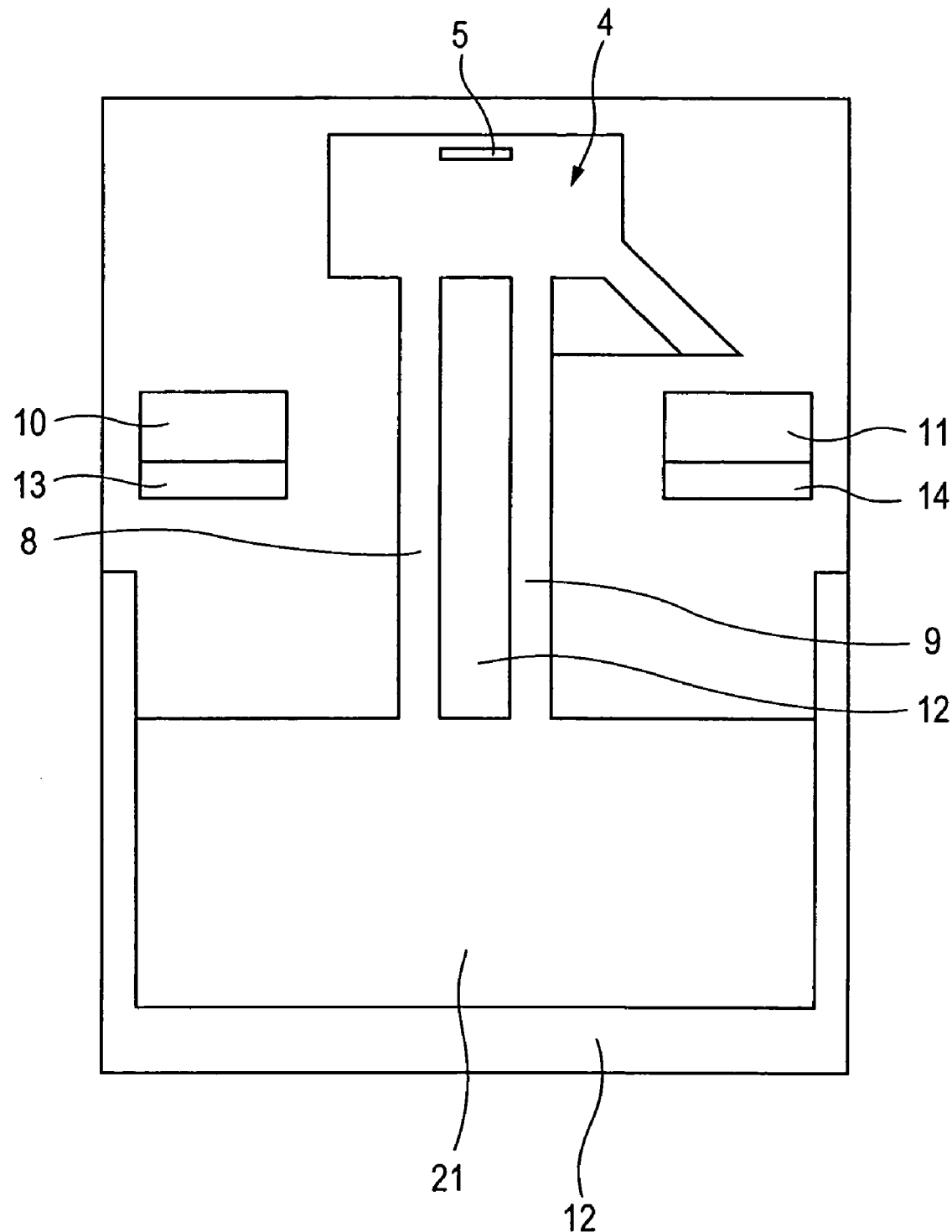
FIG. 11 is a plan view of a magnetic head slider of Comparative Example 5 as viewed from a disk-facing surface.

FIG. 11 is a plan view showing a magnetic head slider of Comparative Example 5. The magnetic head slider of Comparative Example 5 differs from that of Embodiment 1 shown in FIG. 2 in that a raised leading surface 21 that is not separated in the width direction (X-direction in the drawing) is provided.

Figure 6:
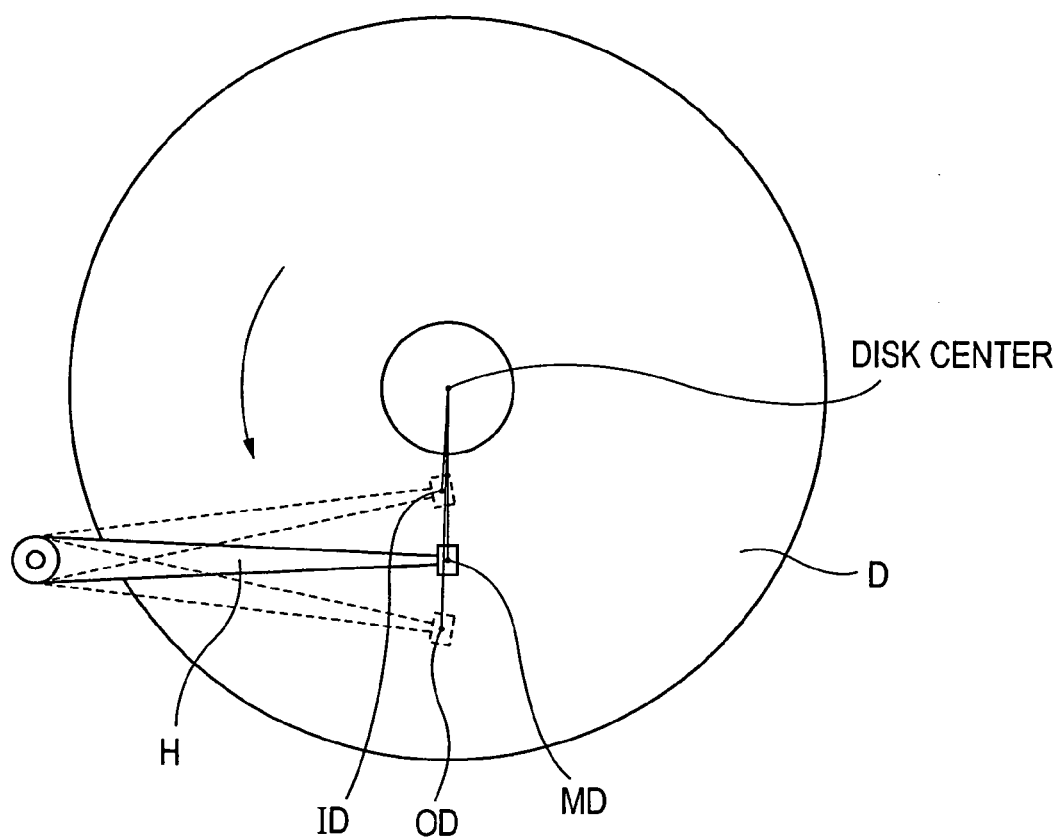
FIG. 6 is a plan view showing a magnetic head assembly H and a magnetic disk D.
Figure 12:
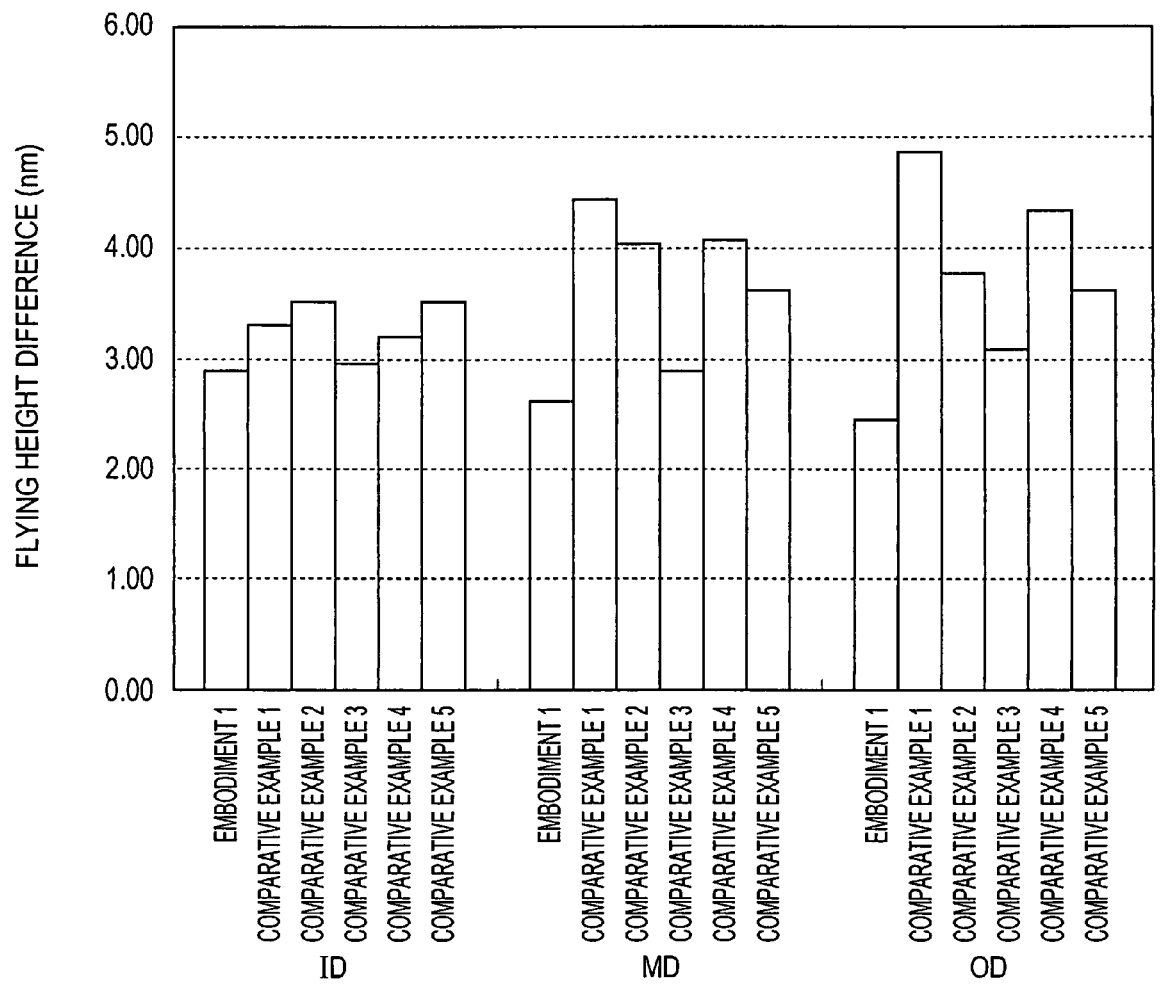
FIG. 12 is a graph showing, with respect to the magnetic head slider of each of Embodiment 1 and Comparative Examples 1 to 5 and each of points ID, MD, and OD on the magnetic disk D in FIG. 6, a flying height difference determined by subtracting the flying height of the magnetic head slider under atmospheric pressure at high altitude (3048 m) from the flying height of the magnetic head slider under atmospheric pressure at ground level (sea level).
Figure 13:
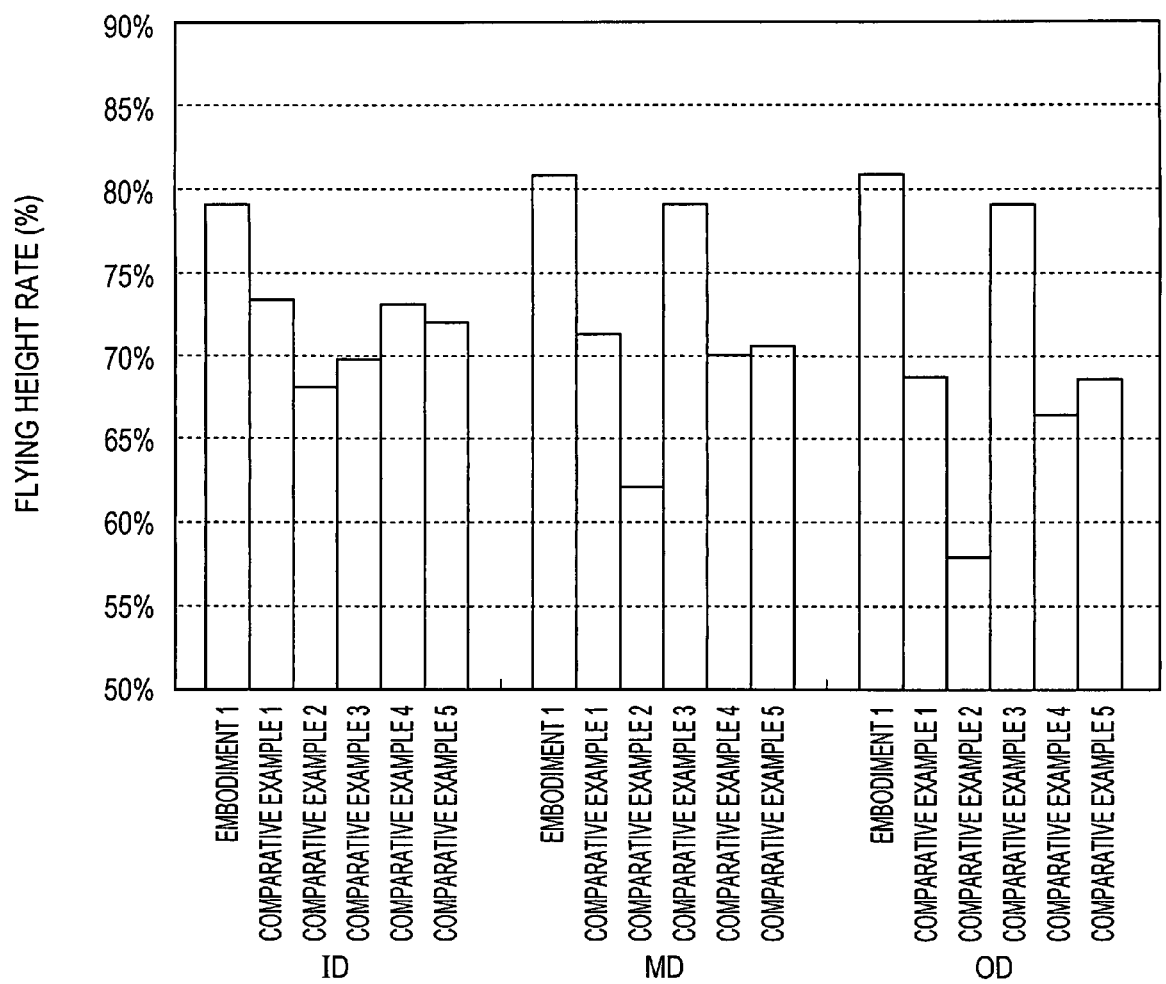
FIG. 13 is a graph showing, with respect to the magnetic head slider of each of Embodiment 1 and Comparative Examples 1 to 5 and each of the points ID, MD, and OD on the magnetic disk D in FIG. 6, the flying height ratio (%) of the flying height of the magnetic head slider under atmospheric pressure at high altitude (3048 m) to the flying height of the magnetic head slider under atmospheric pressure at ground level (sea level).

In this experiment, the magnetic head sliders of the Comparative Examples 1 to 5 were individually attached to the supporting member 22 shown in FIG. 3 and were raised above the magnetic disk D as in FIG. 6. Then, as shown in FIG. 6, the flying height of each magnetic head slider under atmospheric pressure at ground level (0 m, sea level) and under atmospheric pressure at high altitude (3048 m) was measured at a point MD, which is located substantially in the middle of the diameter of the magnetic disk D (i.e., located at a distance of 7 mm from the disk center), at a point ID, which is located inside the point MD (i.e., located at a distance of 5 mm from the disk center), and at a point OD, which is located outside the point MD (i.e., located at a distance of 8.7 mm from the disk center). Then, with respect to each of the magnetic head sliders and each of the points described above, a difference in flying height was determined by subtracting the flying height at high altitude from the flying height at ground level. FIG. 12 shows the result of this experiment. FIG. 13 is a graph showing, with respect to each of the magnetic head sliders and each of the points described above, a flying height ratio determined by multiplying 100 by the quotient obtained by dividing the flying height under atmospheric pressure at high altitude (3048 m) by the flying height under atmospheric pressure at ground level (0 m, sea level), where the flying height is indicated by "δ" in FIG. 5.

As show in FIG. 12 and FIG. 13, a flying height difference at each point in Embodiment 1 was smaller than that in any of Comparative Examples 1 to 5, and a flying height ratio at each point in Embodiment 1 was larger than that in any of Comparative Examples 1 to 5. This result shows that, in Embodiment 1, the flying position of the magnetic head slider can be stabilized even if the amount of air inflow is reduced due to changes in atmospheric pressure.

In particular, comparison between Embodiment 1 and Comparative Example 3 revealed that a difference in the flying height of the magnetic head slider caused by atmospheric pressure changes in Embodiment 1 was smaller than that in Comparative Example 3. As described above, in Comparative Example 3, no central step surface 12b is provided between the rail surfaces 8 and 9, and the recessed area 20 that causes a negative pressure is provided instead. In this case, air entering from the central step surface 12b between raised leading surfaces 6 and 7 passes through the recessed area 20 between the rail surfaces 8 and 9 and reaches a magnetic device surface 4. However, the air from the central step surface 12b tends to be disturbed when passing through the recessed area 20 having a level difference, and does not smoothly flow to the magnetic device surface 4 at a height much higher than the recessed area 20. Therefore, in the magnetic head slider of Comparative Example 3, a flying height difference due to atmospheric pressure changes is larger than that in the magnetic head slider of Embodiment 1.

The experimental results indicated that, as shown in FIG. 1 and FIG. 2, it is preferable that the raised leading surfaces 6 and 7 at the same height as the magnetic device surface 4 be arranged separately in the width direction (X-direction in the drawings), and that the raised leading surfaces 6 and 7 be connected to the magnetic device surface 4 via the rail surfaces 8 and 9 at the same height as the magnetic device surface 4 and raised leading surfaces 6 and 7. The results also indicated that it is preferable that the central step surface 12b at a height lower than the magnetic device surface 4 and raised leading surfaces 6 and 7 and higher than the recessed area 3 be provided between the raised leading surfaces 6 and 7 and between rail surfaces 8 and 9.

What is claimed is:

1. A magnetic head slider comprising:
    a slider; and
    a magnetic device disposed on a trailing edge of the slider and configured to at least one of write a signal to or read a signal from a magnetic disk,
    wherein a disk-facing surface of the slider comprises:
        a magnetic device surface disposed on a trailing side, rising toward the magnetic disk, and where a surface of the magnetic device is exposed;
        raised leading surfaces disposed on a leading side opposite the trailing side, raised to the height of the magnetic device surface, and separated in a width direction orthogonal to a length direction extending from the trailing side to the leading side;
        a pair of rail surfaces raised to the height of the magnetic device surface and connecting the magnetic device surface to the raised leading surfaces;
        a recessed area disposed outside of the rail surfaces in a width direction, raised to a lowest level in height; and
        a step surface extending from an area between the raised leading surfaces to a leading edge of the magnetic device surface, being raised to a level lower than the magnetic device surface and higher than the recessed area.

* * * * *

UNITED STATES PATENT AND TRADEMARK OFFICE
CERTIFICATE OF CORRECTION

PATENT NO. : 7,499,245 B2  Page 1 of 1
APPLICATION NO. : 11/339418
DATED : March 3, 2009
INVENTOR(S) : Junsei Ueda It is certified that error appears in the above-identified patent and that said Letters Patent is hereby corrected as shown below:

On the Title Page

Item (75), after "Junsei Ueda," insert --deceased,--.

Item (57), line 8, under "ABSTRACT", after "if the amount of" delete "Air" and substitute --air-- in its place.

Signed and Sealed this

Fourth Day of August, 2009

JOHN DOLL
*Acting Director of the United States Patent and Trademark Office*